United States Patent
Chen et al.

(10) Patent No.: US 10,047,194 B2
(45) Date of Patent: Aug. 14, 2018

(54) BIODEGRADABLE POLYESTER

(71) Applicants: Tatung Company, Taipei (TW); TATUNG UNIVERSITY, Taipei (TW)

(72) Inventors: C. Will Chen, Taipei (TW); Ching-Huang Wang, Taipei (TW); Ping-Hsun Tsai, Taipei (TW)

(73) Assignees: Tatung Company, Taipei (TW); TATUNG UNIVERSITY, Taipei (TW)

( * ) Notice: Subject to any disclaimer, the term of this patent is extended or adjusted under 35 U.S.C. 154(b) by 0 days.

(21) Appl. No.: 13/909,102

(22) Filed: Jun. 4, 2013

(65) Prior Publication Data

US 2014/0221598 A1 Aug. 7, 2014

(30) Foreign Application Priority Data

Feb. 1, 2013 (TW) .............................. 102103989 A

(51) Int. Cl.
C08G 63/60 (2006.01)

(52) U.S. Cl.
CPC .................................... C08G 63/60 (2013.01)

(58) Field of Classification Search
CPC .... C08G 18/10; C08G 18/12; C08G 18/3256; C08G 18/307; C08G 18/3296; C08G 18/4812; C08G 18/222; C08G 18/4829; C08G 18/4866; C08G 18/7671; C08G 18/798; C08G 18/8054; C08G 2170/20; C08G 2190/00
USPC .......................................... 528/300, 354, 355
See application file for complete search history.

(56) References Cited

U.S. PATENT DOCUMENTS 3,502,623 A * 3/1970 Hurworth .............. C08G 63/06
528/296
5,256,760 A * 10/1993 Jaffe et al. .................... 528/183

FOREIGN PATENT DOCUMENTS

| CN | 102977565 | 3/2013 |
|---|---|---|
| TW | 200833279 | 8/2008 |
| TW | 201249912 | 12/2012 |
| TW | 201323504 | 6/2013 |

OTHER PUBLICATIONS

Tsai et al "Copoiyesters. IV. Copoiyesters of Polycaprolactone and Poly(butyiene Terephthalate)",Journal of Applied Polymer Science, vol. 39, 233-240 (1990).*

Ching-Huang Wang et al "Synthesis and Characterization of Copolymeric Aliphatic-Aromatic Esters Derived from Terephthalic Acid, 1,4-Butanediol, and e-Caprolactone by Physical, Thermal, and Mechanical Properties and NMR Measurements" Published Jun. 4, 2012, pp. 4385-4394.*

Cheng et al "Proton NMR Characterization of Chain Structure in Butylene Terephthalate Caprolactone Copolyesters", May 1999.*

* cited by examiner

*Primary Examiner* — Ling Siu Choi
*Assistant Examiner* — Gennadiy Mesh
(74) *Attorney, Agent, or Firm* — JCIPRNET

(57) ABSTRACT

A biodegradable polyester is consisting of a poly(terephthalate-di-(ε-caprolactone) segment, a poly(terephthalate-butylene-terephthalate) segment, a poly(terephthalate-butylene-ε-caprolactone) segment, a poly(ε-caprolactone-butylene-ε-caprolactone) segment, and a poly(tri(ε-caprolactone) segment. The above five segments are obtained by polycondensation reaction of terephthalic acid, 1,4-butanediol and ε-caprolactone under the presence of a catalyst, with a polycondensation temperature of 255° C. to 270° C. and a polycondensation time of 2 hours to 4 hours. Furthermore, based on 1 mole of terephthalic acid, a molar ratio of 1,4-butanediol to terephthalic acid is in the range of 1.1 to 1.4, and a molar ratio of ε-caprolactone to terephthalic acid is in the range of 0.5 to 1.6. The biodegradable polyester can have a melting point (Tm) of 90° C. to 170° C.

3 Claims, 1 Drawing Sheet

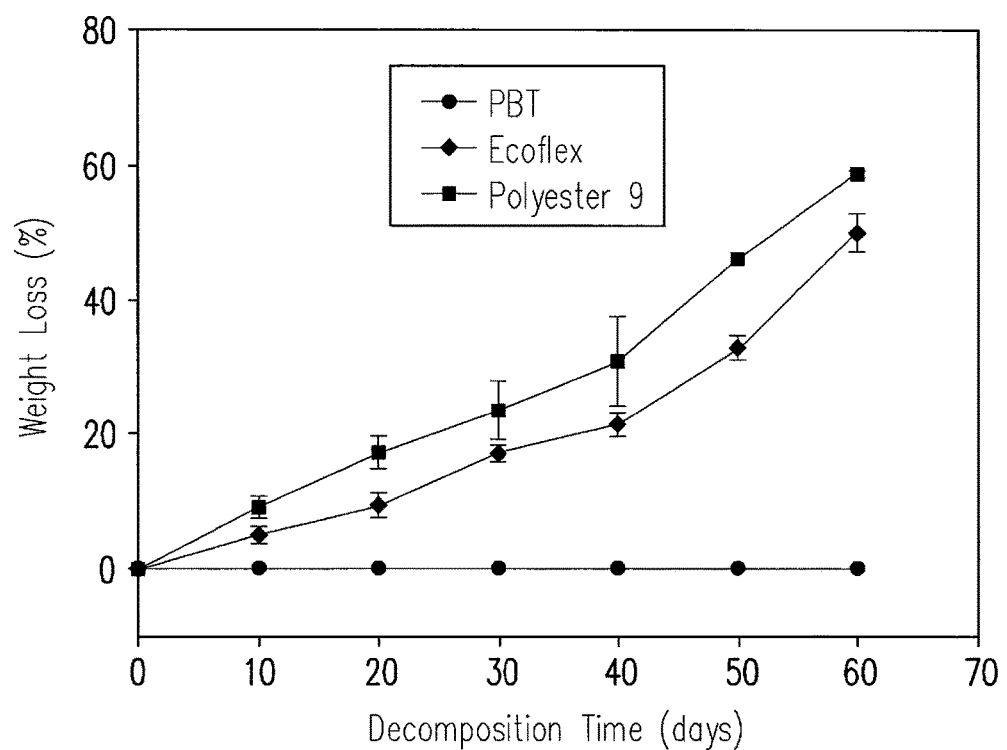

BIODEGRADABLE POLYESTER

CROSS-REFERENCE TO RELATED APPLICATION

This application claims the priority benefit of Taiwan application serial no. 102103989, filed on Feb. 1, 2013. The entirety of the above-mentioned patent application is hereby incorporated by reference herein and made a part of this specification.

BACKGROUND

Field of the Application

The invention relates to a polyester, and more particularly, to a biodegradable polyester.

Description of Related Art

In recent years, there has been renewal of interest in development of biodegradable polyester due to that can be considered an alternative to conventional non-biodegradable plastics and a viable way in reducing pollutions originating from plastic wastes, after use when it enters the waste system. Biodegradable polyesters are degraded and catabolized by microorganism enzymes such as lipase or esterase, able to cleave polymeric molecules reducing progressively their molecular weight, as well as metabolism to carbon dioxide and water are produced during composting conditions. Generally, the development of biodegradable polymer should be considered its characterization such as physical, thermal, mechanical properties and biodegradability for using in commercial application. A series of biodegradable plastics based on low cost biomass (e.g. starch or cellulose) blending with biodegradable polyesters have been developed in order to improve its cost competitiveness whilst maintaining their mechanical properties at an acceptable level.

The biodegradable polyester plays a very important role in applications of biodegradable plastic or biomass plastic. Most biodegradable plastics adopt biomaterials as sources, and are obtained through compounding or polymerizing. For example, starch compounded plastics adopt starch as a raw material, a polylactate (PLA) adopts lactic acids of a microbial fermentation as a raw material, a microbial polyester adopts a polyhydroxyalkanoates (PHA) obtained in the microbial fermentation as a raw material. Generally, an adding amount of the biodegradable polyester in the biodegradable plastics may be up to more than fifty percent. An important function of the biodegradable polyester is to improve an essential too high or too low melting temperature of various materials (e.g., starch, PLA or PHA) in the biodegradable plastics, or adjust defects in mechanical strength thereof, such as problems in insufficient tensile strength, ductility or tensile elasticity, or poor hardness. In addition, when improving the hot melt property and the mechanical strength of the biodegradable plastics, the biodegradable polyester does not affect the biodegradability of the biodegradable plastics, and may even adjust a degradation time of the biodegradable plastics, so as to expand the applications and the economic benefits thereof in exploiting the different markets.

Ranges of applications of the biodegradable plastics are very broad, and mainly include application fields that are difficult to recover or with limited success in recycling, fields of certain professional purposes, and products applied in the natural environment. In detail, the application fields that are difficult to recover or with limited success in recycling include personal hygiene products, food packaging materials and daily commodities, such as shopping bags, strappings, bottles, cosmetic containers, pens, pencil boxes, lightweight raincoat, fresh food packaging trays, fast food containers (bowls, plates, soup cups, boxes), plastic wraps, packaging bags, garbage bags, food waste bags, toothbrushes, disposable underwear, food packaging films and beverage packaging material, 3C home appliance casings and anti-static bag, and so forth. Particular medical uses includes biodegradable and absorbable or slow-release materials, such as materials for sustained-releasing drugs, dental plastics, bone plates, bone screws (pin, bolt, hook ring and so forth), surgical sutures, medical sponges, gauzes, wound dressings, nerve guides, blood vessel substitutes, disposable medical equipments and rehabilitation supplies, and so forth. In addition, it also includes agricultural applications, such as agricultural films and utensils, containers of pesticides or fertilizers, delivery materials, and so forth. Products applied in the natural environment includes civil engineering and construction materials or outdoor leisure goods, for example, the vegetative cover nets, retaining nets, soil and water conservation cloth materials, golf tees, fishing tackles, hiking supplies or ocean sports supplies. After many of the aforementioned products have adopted the biodegradable plastic materials, the indecomposable plastics that have caused serious pollutions to the environment may be replaced, and thus have a significant contribution to the environmental protection. Therefore, exploitations of the biodegradable polyester are substantially key researches for developing the biodegradable plastic materials, and have become an important industry in the future.

SUMMARY OF THE APPLICATION

The invention provides a biodegradable polyester having proper biodegradability and melting point.

The biodegradable polyester of the invention is composed of: a poly(terephthalate-di-(ε-caprolactone) unit, a poly(terephthalate-butylene-terephthalate) unit, a poly(terephthalate-butylene-ε-caprolactone) unit, a poly(ε-caprolactone-butylene-ε-caprolactone), and poly(tri(ε-caprolactone) unit.

In an embodiment of the invention, monomers of each unit include terephthalic acid, 1,4-butanediol and ε-caprolactone.

In an embodiment of the invention, a molecular weight of the biodegradable polyester unit is 30,000 g/mol to 100,000 g/mol.

In an embodiment of the invention, a melting point ($T_m$) of the biodegradable polyester is 90° C. to 170° C.

In an embodiment of the invention, the biodegradable polyester has biodegradability of 3% to 100%.

In an embodiment of the invention, a molar percentage of the poly(terephthalate-di-(ε-caprolactone) unit is 25% to 33%, a molar percentage of the poly(terephthalate-butylene-terephthalate) unit is 19% to 45%, a molar percentage of the poly(terephthalate-butylene-ε-caprolactone) unit is 21% to 24%, a molar percentage of the poly(ε-caprolactone-butylene-ε-caprolactone) unit is 3% to 7%, and a molar percentage of the poly(tri(ε-caprolactone) unit is 6% to 19%.

In an embodiment of the invention, a molecular weight of the poly(terephthalate-di-(ε-caprolactone) unit is 17,000 to 30,000, a molecular weight of the poly(terephthalate-butylene-terephthalate) unit is 17,000 to 32,000, a molecular weight of the poly(terephthalate-butylene-ε-caprolactone) unit is 14,000 to 21,000, a molecular weight of the poly(ε-caprolactone-butylene-ε-caprolactone) unit is 2,100 to 6,400, and a molecular weight of the poly(tri(ε-caprolactone) unit is 4,200 to 17,500.

In an embodiment of the invention, a number of the poly(terephthalate-di-(ε-caprolactone) unit is 38 to 67, a number of the poly(terephthalate-butylene-terephthalate) unit is 44 to 82, a number of the poly(terephthalate-butylene-ε-caprolactone) unit is 38 to 53, a number of the poly(ε-caprolactone-butylene-ε-caprolactone) unit is 5 to 17, and a number of the poly(tri(ε-caprolactone) unit is 9 to 40.

In an embodiment of the invention, when a sum of molar percentages of the poly(terephthalate-butylene-ε-caprolactone) unit, the poly(ε-caprolactone-butylene-ε-caprolactone) unit and the poly(tri(ε-caprolactone) unit is 40% to 48%, biodegradability of the biodegradable polyester is 40% to 73%.

In an embodiment of the invention, when a sum of mole percentages of the poly(terephthalate-di-(ε-caprolactone) unit and the poly(tri(ε-caprolactone) unit is 43% to 52%, biodegradability of the biodegradable polyester is 40% to 73%.

According to the foregoing, the biodegradable polyester of the invention is composed of five units, which respectively are the poly(terephthalate-di-(ε-caprolactone) unit, the poly(terephthalate-butylene-terephthalate) unit, the poly(terephthalate-butylene-ε-caprolactone) unit, the poly(ε-caprolactone-butylene-ε-caprolactone) unit, and the poly(tri(ε-caprolactone) unit. The biodegradable polyester has an adjustable biodegradability and a thermal processing melting point, and thus may be coordinated with a variety of biomaterials to fabricate biodegradable plastics of different uses. Hence, the invented biodegradable polyester may significantly improve inherent properties of the biodegradable plastics, and be widely applied in product developments of the biodegradable plastics.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

FIG. 1 shows the same tendency during the biodegradability test of experimental example 9 and Ecoflex®, wherein poly(butylene-terephthalate) (PBT) is used as a negative control, and the experimental example 9 had slightly better biodegradability than Ecoflex® during the lipase degradation test.

DETAILED DESCRIPTION OF DISCLOSED EMBODIMENTS

An embodiment of the invention provides a biodegradable polyester composed of poly(terephthalate-di-(ε-caprolactone) unit, referred to as $p(TCC)_{n4}$, poly(terephthalate-butylene-terephthalate) unit, referred to as $p(TBT)_{n3}$, poly(terephthalate-butylene-ε-caprolactone) unit, referred to as $p(TBC)_{n1}$, poly(ε-caprolactone-butylene-ε-caprolactone) unit, referred to as $p(CBC)_{n5}$ and poly(tri(ε-caprolactone) unit, referred to as $p(CCC)_{n2}$, wherein n1-n5 respectively are a number of each unit. Namely, the biodegradable polyester is composed of the abovementioned five units.

In an embodiment, monomers that compose each unit include terephthalic acid, 1,4-butanediol and ε-caprolactone. Namely, under the presence of a catalyst, terephthalic acid, 1,4-butanediol and ε-caprolactone form the five units through a polycondensation reaction, and each unit may respectively have repeating numbers. In an embodiment, a molar ratio of 1,4-butanediol and terephthalic acid, for example, is 1.1 to 1.4, and a molar ratio of ε-caprolactone and terephthalic acid, for example, is 0.5 to 1.6. An esterification reaction time of the polymerization, for example, is 2 hours to 4 hours, and a condensation temperature thereof is, for example, 240° C. to 270° C.

In an embodiment, the number of each unit and ratios of the five units in the biodegradable polyester may be controlled by adjusting polymerization conditions of the biodegradable polyester, so that the biodegradable polyester has adjustable biodegradability and melting point. In an embodiment, a molecular weight of the biodegradable polyester, for example, is 30,000 g/mol to 100,000 g/mol, and a corresponding melting point ($T_m$) is, for example, 90° C. to 170° C. In an embodiment, the biodegradability of the biodegradable polyester, for example, is 3% to 100%. In an embodiment, the biodegradability of the biodegradable polyester, for example, is 10% to 100%.

In an embodiment, the biodegradable polyester is composed of the five units, wherein a molar percentage of the poly(terephthalate-di-(ε-caprolactone) unit is 25% to 33%, a molar percentage of the poly(terephthalate-butylene-terephthalate) unit is 19% to 45%, a molar percentage of the poly(terephthalate-butylene-ε-caprolactone) unit is 21% to 24%, a molar percentage of the poly(ε-caprolactone-butylene-ε-caprolactone) unit is 3% to 7%, and a molar percentage of the poly(tri(ε-caprolactone) unit is 6% to 19%.

In an embodiment, when a sum of molar percentages of the poly(terephthalate-butylene-ε-caprolactone) unit, the poly(ε-caprolactone-butylene-ε-caprolactone) unit and the poly(tri(ε-caprolactone) unit is 40% to 48%, the biodegradability of the biodegradable polyester is 40% to 73%.

In an embodiment, when a sum of molar percentages of the poly(terephthalate-di-(ε-caprolactone) unit and the poly(tri(ε-caprolactone) unit is 43% to 52%, the biodegradability of the biodegradable polyester is 40% to 73%.

In an embodiment, the biodegradable polyester is composed of the five units, wherein a molecular weight of the poly(terephthalate-di-(ε-caprolactone) unit is 17,000 to 30,000, a molecular weight of the poly(terephthalate-butylene-terephthalate) unit is 17,000 to 32,000, a molecular weight of the poly(terephthalate-butylene-ε-caprolactone) unit is 14,000 to 21,000, a molecular weight of the poly(ε-caprolactone-butylene-ε-caprolactone) unit is 2,100 to 6,400, and a molecular weight of the poly(tri(ε-caprolactone) unit is 4,200 to 17,500.

In an embodiment, the biodegradable polyester is composed of the five units, wherein a number of the poly(terephthalate-di-(ε-caprolactone) unit is 38 to 67, a number of the poly(terephthalate-butylene-terephthalate) unit is 44 to 82, a number of the poly(terephthalate-butylene-ε-caprolactone) unit is 38 to 53, a number of the poly(ε-caprolactone-butylene-ε-caprolactone) unit is 5 to 17, and a number of the poly(tri(ε-caprolactone) unit is 9 to 40.

In the above embodiments, the number of each unit and the ratios of the five units in the biodegradable polyester may be controlled by adjusting the polymerization conditions of the biodegradable polyester, so that the biodegradable polyester has the adjustable biodegradability and melting point. As a result, the biodegradable polyester with proper biodegradability and melting point may be manufactured according to desired combinations of biomaterials, and thereby produce a variety of biodegradable plastics with a variety of uses. Therefore, the biodegradable polyester can greatly improve technical levels of the biodegradable plastics, widely be applied in product developments of the biodegradable plastics, and achieve the purpose of protecting environment.

In the following embodiment of the invention, a manufacturing method of the biodegradable polyester and characteristics of the biodegradable polyester are to be described with experimental examples 1-10. Table 1 shows operating conditions of the experimental examples 1-10, and detailed steps are as described in the following.

TABLE 1

The operating conditions for the experimental examples 1-10.

| Experimental example | Esterification reaction time (hr) | Condensation temperature (° C.) | 1,4-butanediol (mol/mol) | ε-caprolactone (mol/mol) |
|---|---|---|---|---|
| 1 | 2 | 240 | 1.1 | 0.8 |
| 2 | 3 | 270 | 1.1 | 0.8 |
| 3 | 3 | 240 | 1.4 | 0.8 |
| 4 | 3 | 270 | 1.4 | 0.8 |
| 5 | 2 | 240 | 1.1 | 1.6 |
| 6 | 2 | 270 | 1.1 | 1.6 |
| 7 | 4 | 240 | 1.4 | 1.6 |
| 8 | 4 | 270 | 1.4 | 1.6 |
| 9 | 4 | 255 | 1.39 | 1.48 |
| 10 | 2 | 260 | 1.4 | 0.5 |

Note:
Amounts of 1,4-butanediol and ε-caprolactone are based on 1 mole of terephthalic acid.

EXPERIMENTAL EXAMPLE 1

In the experimental example, firstly, 1 mole of terephthalic acid, 1.1 mole of 1,4-butanediol and 0.8 mole of ε-caprolactone are weighted out as raw materials and is added into a reactor, and 0.74 mmole of stannous octoate (referred to as $Sn(Oct)_2$) catalyst are added into the reactor at the same time. Nitrogen is passed into the reactor at a flow rate of 1 L/min, and an esterification temperature is set at 200° C. with a stirring speed of 500 rpm, so as to perform 2 hours of esterification reaction. After the esterification reaction is finished, 0.293 mmole of tetra-n-butyl titanate (referred to as $Ti(Obu)_4$) catalyst is added while the temperature is slowly raised to a condensation reaction temperature of 240° C., and a vacuum level is lowered to less than 0.5 mmHg via a hydraulic pump, so as to perform 2 hours of condensation reaction for obtaining a polyester 1. An evaluation of the polyester 1 obtained by the above-mentioned conditions is performed, a measured intrinsic viscosity (IV) thereof is 0.24 dL/g, a measured number-average molecular weight ($M_n$) thereof is $4.6\times10^4$ g/mol, and a measured melting point ($T_m$) thereof is 131° C. Furthermore, a mechanical strength test is performed to the polyester 1, and through an ASTM 638 type IV test, a measured tensile strength (σ) of the polyester 1 is 6.8 MPa, and a measured elongation at break of the polyester 1 (ε) is 19.9%. Next, by performing a 60 day lipase hydrolysis test to the polyester 1 to evaluate the biodegradability thereof, a weight loss of the polyester 1 is measured to be 38.7%.

EXPERIMENTAL EXAMPLE 2

In this experimental example, firstly, 1 mole of terephthalic acid, 1.1 mole of 1,4-butanediol and 0.8 mole of ε-caprolactone are weighted out as raw materials and is added into the reactor, and 0.74 mmole of $Sn(Oct)_2$ catalyst is added into the reactor at the same time. Nitrogen is passed into the reactor at a flow rate of 1 L/min, and the esterification temperature is set at 200° C. with a stirring speed of 500 rpm, so as to perform 3 hours of esterification reaction. After the esterification reaction is finished, 0.293 mmole of $Ti(Obu)_4$ catalyst is added while the temperature is slowly raised to a condensation reaction temperature of 270° C., and a vacuum level is lowered to less than 0.5 mmHg via the hydraulic pump, so as to perform 3 hours of condensation reaction to obtain a polyester 2. An evaluation of the polyester 2 obtained by the above-mentioned conditions is performed, a measured intrinsic viscosity (IV) thereof is 0.17 dL/g, a number-average molecular weight ($M_n$) thereof is $3.4\times10^4$ g/mol, and a measured melting point ($T_m$) thereof is 123.5° C. Furthermore, a mechanical strength test is performed to the polyester 2, and through the ASTM 638 type IV test, a measured tensile strength (σ) of the polyester 2 is 5.6 MPa, and a measured elongation at break (ε) of the polyester 2 is 2.2%. Next, by performing the 60 day lipase hydrolysis test to the polyester 2 to evaluate the biodegradability thereof, a weight loss of the polyester 2 is measured to be 100%.

EXPERIMENTAL EXAMPLE 3

In this experimental example, firstly, 1 mole of terephthalic acid, 1.4 mole of 1,4-butanediol and 0.8 mole of ε-caprolactone are weighted as raw materials and is added into the reactor, and 0.74 mmole of $Sn(Oct)_2$ catalyst are added at the same time. Nitrogen is passed into the reactor at a flow rate of 1 L/min, and the esterification temperature is set at 200° C. with a stirring speed of 500 rpm, so as to perform 3 hours of esterification reaction. After the esterification reaction is finished, 0.293 mmole of $Ti(Obu)_4$ catalyst is added while the temperature is slowly raised to a condensation reaction temperature of 240° C., and a vacuum level is lowered to less than 0.5 mmHg via the hydraulic pump, so as to perform 3 hours of condensation reaction to obtain a polyester 3. An evaluation of the polyester 3 obtained by the above-mentioned conditions is performed, a measured intrinsic viscosity (IV) thereof is 0.53 dL/g, a number-average molecular weight ($M_n$) thereof is $9.4\times10^4$ g/mo, and a measured melting point ($T_m$) thereof is 161.1° C. Furthermore, a mechanical strength test is performed to the polyester 3, and through the ASTM 638 type IV test, a measured tensile strength (σ) of the polyester 3 is 25.8 MPa, and a measured elongation at break (ε) of the polyester 3 is 24.1%. Next, by performing the 60 day lipase hydrolysis test to the polyester 3 to evaluate the biodegradability thereof, a weight loss of the polyester 3 is measured to be 3.8%.

EXPERIMENTAL EXAMPLE 4

In this experimental example, firstly, 1 mole of terephthalic acid, 1.4 mole of 1,4-butanediol and 0.8 mole of ε-caprolactone are weighted out as raw material and is added into the reactor, and 0.74 mmole of $Sn(Oct)_2$ catalyst is added into the reactor. Nitrogen is passed into the reactor at a flow rate of 1 L/min, and the esterification temperature is set at 200° C. with a stirring speed of 500 rpm, so as to perform 3 hours of esterification reaction. After the esterification reaction is finished, 0.293 mmole of $Ti(Obu)_4$ catalyst is added while the temperature is slowly raised to a condensation reaction temperature of 270° C., and a vacuum level is lowered to less than 0.5 mmHg via the hydraulic pump, so as to perform 3 hours of condensation reaction to obtain a polyester 4. An evaluation of the polyester 4 obtained by the above-mentioned conditions is performed, a measured intrinsic viscosity (IV) thereof is 0.38 dL/g, a number-average molecular weight ($M_n$) thereof is $7\times10^4$ g/mol, and a measured melting point ($T_m$) thereof is 172° C. Furthermore, a mechanical strength test is performed to the polyester 4, and through the ASTM 638 type IV test, a measured tensile strength (σ) of the polyester 4 is 21.9 MPa, and a measured elongation at break (ε) of the polyester 4 is 14.1%. By performing the 60 day lipase hydrolysis test to the polyester 4 to evaluate the biodegradability thereof, a weight loss of the polyester 4 is measured to be 19.2%. In addition, a $^1$H-NMR resonance spectroscopy bonding intensity measurement and a chemical structure identification are performed to the polyester 4, and the results are as shown in Table 2. It can be known from Table 2, the polymerized polyester 4 is composed of five units $p(TBT)_{n3}$, $p(TBC)_{n1}$, $p(TCC)_{n4}$, $p(CBC)_{n5}$ and $p(CCC)_{n2}$ that respectively have a certain number.

measured intrinsic viscosity (IV) thereof is 0.31 dL/g, a number-average molecular weight (Mn) thereof is $5.8 \times 10^4$ g/mol, and a measured melting point ($T_m$) thereof is 90.0° C.

TABLE 2

$^1$H-NMR Resonance Spectroscopy Bonding Intensity Measurement and Chemical Structure Identification of the Polyester Obtained in the Experimental Example 4.
Chemical shift (in ppm) and intensities (in paratheses) of proton resonances in the middle monomer (bold) of linkage

| Structure name | $B_1$ (2H) | $B_2$ (2H) | $B_3$ (2H) | $B_4$ (2H) | $C_1$ (2H) | $C_2$ (2H) | $C_3$ (2H) | $C_4$ (2H) | $C_5$ (2H) | $I_{av}$ | $M_p$ (mol %) |
|---|---|---|---|---|---|---|---|---|---|---|---|
| $p(\mathbf{TBT})_{n3}$ | 4.41 (I = 337/2) | 1.95 (I = 341/2) | 1.95 (I = 341/2) | 4.41 (I = 337/2) | — | — | — | — | — | 170 | 45 |
| $p(\mathbf{TBC})_{n1}$ | 4.35 (I = 78) | 1.84 (I = 87) | 1.78 (—) | 4.13 (I = 75) | — | — | — | — | — | 80 | 21 |
| $p(\mathbf{TCC})_{n4}$ | — | — | — | — | 4.32 (I = 95) | 1.78 (—) | 1.47 (I = 96) | 1.68 (—) | 2.32 (I = 92) | 94 | 25 |
| $p(\mathbf{CBC})_{n5}$ | 4.06 (I = 20/2) | 1.68 (—) | 1.68 (—) | 4.06 (I = 20/2) | — | — | — | — | — | 10 | 3 |
| $p(\mathbf{CCC})_{n2}$ | — | — | — | — | 4.03 (I = 24) | 1.62 (I = 47/2) | 1.35 (I = 28) | 1.62 (I = 47/2) | 2.28 (I = 23) | 24 | 6 |

$I_{av}$ = average bonding intensity is obtained by calculating intensities (I value is based on that I of 8.01 ppm = 400) measured by chemical shifts of different protons in bonding intermediates.
$M_p$ = relative mole percentage is obtained by calculating percentages of average intensity $I_{av}$ in different structures.
(—): represents that overlapping of chemical shifts of protons of different structures, and the intensity thereof can not be accurately measured.

EXPERIMENTAL EXAMPLE 5

In this experimental example, firstly, 1 mole of terephthalic acid, 1.1 mole of 1,4-butanediol and 1.6 mole of ε-caprolactone are weighted out as raw materials and is added into the reactor, and 0.74 mmole of $Sn(Oct)_2$ catalyst is added into the reactor. Nitrogen is passed into the reactor at a flow rate of 1 L/min, and the esterification temperature is set at 200° C. with a stirring speed of 500 rpm, so as to perform 2 hours of esterification reaction. After the esterification reaction is finished, 0.293 mmole of $Ti(Obu)_4$ catalyst is added while the temperature is slowly raised to a condensation reaction temperature of 240° C., and a vacuum level is lowered to less than 0.5 mmHg via the hydraulic pump, so as to perform 2 hours of condensation reaction to obtain a polyester 5. An evaluation of the polyester 5 obtained by the above-mentioned conditions is performed, a measured intrinsic viscosity (IV) thereof is 0.31 dL/g, a number-average molecular weight ($M_n$) thereof is $5.8 \times 10^4$ g/mol, and a measured melting point ($T_m$) thereof is 78.8° C. By performing the 60 day lipase hydrolysis test to the polyester 5 to evaluate the biodegradability thereof, a weight loss of the polyester 5 is measured to be 100%. Since a specimen for performing the ASTM 638 type IV test is unable to be made from the polyester 5, no mechanical strength test to the polyester 5 is performed.

EXPERIMENTAL EXAMPLE 6

In this experimental example, firstly, 1 mole of terephthalic acid, 1.1 mole of 1,4-butanediol and 1.6 mole of ε-caprolactone are weighted out as raw materials and is added into the reactor, and 0.74 mmole of $Sn(Oct)_2$ catalyst is added into the reactor. Nitrogen is passed into the reactor at a flow rate of 1 L/min, and the esterification temperature is set at 200° C. with a stirring speed of 500 rpm, so as to perform 2 hours of esterification reaction. After the esterification reaction is finished, 0.293 mmole of $Ti(Obu)_4$ catalyst is added while the temperature is slowly raised to a condensation reaction temperature of 270° C., and a vacuum level is lowered to less than 0.5 mmHg via the hydraulic pump, so as to perform 2 hours of condensation reaction to obtain a polyester 6. An evaluation of the polyester 6 obtained by the above-mentioned conditions is performed, a By performing the 60 day lipase hydrolysis test to the polyester 6 to evaluate the biodegradability thereof, a weight loss of the polyester 6 is measured to be 95.2%. Since a specimen for performing the ASTM 638 type IV test is unable to be made from the polyester 6, no mechanical strength test to the polyester 6 is performed.

EXPERIMENTAL EXAMPLE 7

In this experimental example, firstly, 1 mole of terephthalic acid, 1.4 mole of 1,4-butanediol and 1.6 mole of ε-caprolactone are weighted out as raw materials and is added into the reactor, and 0.74 mmole of $Sn(Oct)_2$ catalyst is added into the reactor. Nitrogen is passed into the reactor at a flow rate of 1 L/min, and the esterification temperature is set at 200° C. with a stirring speed of 500 rpm, so as to perform 4 hours of esterification reaction. After the esterification reaction is finished, 0.293 mmole of $Ti(Obu)_4$ catalyst is added while the temperature is slowly raised to a condensation reaction temperature of 240° C., and a vacuum level is lowered to less than 0.5 mmHg via the hydraulic pump, so as to perform 4 hours of condensation reaction to obtain a polyester 7. An evaluation of the polyester 7 obtained by the above-mentioned conditions is performed, a measured intrinsic viscosity (IV) thereof is 0.51 dL/g, a number-average molecular weight (Mn) thereof is $9.1 \times 10^4$ g/mol, and a measured melting point ($T_m$) thereof is 115.6° C. Furthermore, a mechanical strength test is performed to the polyester 7, and through the ASTM 638 type IV test, a measured tensile strength (σ) of the polyester 7 is 13.1 MPa, and a measured elongation at break (ε) of the polyester 4 is 314.3%. By performing the 60 day lipase hydrolysis test to the polyester 7 to evaluate the biodegradability thereof, a weight loss of the polyester 7 is measured to be 41.5%. In addition, the $^1$H-NMR resonance spectroscopy bonding intensity measurement and the chemical structure identification are performed to the polyester 7, and the results are as shown in Table 3 below. It can be known from Table 3, the polymerized polyester 7 is composed of five units $p(TBT)_{n3}$, $p(TBC)_{n1}$, $p(TCC)_{n4}$, $p(CBC)_{n5}$ and $p(CCC)_{n2}$ that respectively have a specific number of repeating units.

TABLE 3

$^1$H-NMR Resonance Spectroscopy Bonding Intensity
Measurement and Chemical Structure Identification of the Polyester Obtained in the
Experimental Example 7.
Chemical shift (in ppm) and intensities (in paratheses) of proton resonances in the middle
monomer (bold) of linkage

| Structure name | $B_1$ (2H) | $B_2$ (2H) | $B_3$ (2H) | $B_4$ (2H) | $C_1$ (2H) | $C_2$ (2H) | $C_3$ (2H) | $C_4$ (2H) | $C_5$ (2H) | $I_{av}$ | $M_p$ (mol %) |
|---|---|---|---|---|---|---|---|---|---|---|---|
| p(TBT)$_{n3}$ | 4.41 (I = 218/2) | 1.95 (I = 222/2) | 1.95 (I = 222/2) | 4.41 (I = 218/2) | — | — | — | — | — | 110 | 19 |
| p(TBC)$_{n1}$ | 4.35 (I = 126) | 1.84 (I = 139) | 1.78 (—) | 4.13 (I = 125) | — | — | — | — | — | 130 | 22 |
| p(TCC)$_{n4}$ | — | — | — | — | 4.32 (I = 194) | 1.78 (—) | 1.47 (I = 195) | 1.68 (—) | 2.32 (I = 191) | 193 | 33 |
| p(CBC)$_{n5}$ | 4.06 (I = 77/2) | 1.68 (—) | 1.68 (—) | 4.06 (I = 77/2) | — | — | — | — | — | 39 | 7 |
| p(CCC)$_{n2}$ | — | — | — | — | 4.03 (I = 110) | 1.62 (I = 219/2) | 1.35 (I = 114) | 1.62 (I = 219/2) | 2.28 (I = 109) | 111 | 19 |

$I_{av}$ = average bonding intensity is obtained by calculating intensities (I value is based on that I of 8.01 ppm = 400) measured by chemical shifts of different protons in bonding intermediates.
$M_p$ = relative mole percentage is obtained by calculating percentages of average intensity $I_{av}$ in different structures.
(—): represents that overlapping of chemical shifts of protons of different structures, and the intensity thereof can not be accurately measured.

EXPERIMENTAL EXAMPLE 8

In this experimental example, firstly, 1 mole of terephthalic acid, 1.4 mole of 1,4-butanediol and 1.6 mole of ε-caprolactone are weighted out as raw material and is added into the reactor, and 0.74 mmole of Sn(Oct)$_2$ catalyst is added into the reactor. Nitrogen is passed into the reactor at a flow rate of 1 L/min, and the esterification temperature is set at 200° C. with a stirring speed of 500 rpm, so as to perform 4 hours of esterification reaction. After the esterification reaction is finished, 0.293 mmole of Ti(Obu)$_4$ catalyst is added while the temperature is slowly raised to a condensation reaction temperature of 270° C., and a vacuum level is lowered to less than 0.5 mmHg via the hydraulic pump, so as to perform 4 hours of condensation reaction to obtain a polyester 8. An evaluation of the polyester 8 obtained by the above-mentioned conditions is performed, a measured intrinsic viscosity (IV) thereof is 0.40 dL/g, a number-average molecular weight ($M_n$) thereof is 7.3×10$^4$ g/mol, and a measured melting point ($T_m$) thereof is 130.9° C. Furthermore, a mechanical strength test is performed to the polyester 8, and through the ASTM 638 type IV test, a measured tensile strength (σ) of the polyester 8 is 17.6 MPa, and a measured elongation at break (ε) of the polyester 8 is 194.1%. By performing the 60 day lipase hydrolysis test to the polyester 8 to evaluate the biodegradability thereof, a weight loss of the polyester 8 is measured to be 72.6%. In addition, the $^1$H-NMR resonance spectroscopy bonding intensity measurement and the chemical structure identification are performed to the polyester 8, and the results are as shown in Table 4. It can be known from Table 4, the polymerized polyester 8 is composed of five units p(TBT)$_{n3}$, p(TBC)$_{n1}$, p(TCC)$_{n4}$, p(CBC)$_{n5}$ and p(CCC)$_{n2}$ that respectively have a specific number of repeating units.

TABLE 4

$^1$H-NMR Resonance Spectroscopy Bonding Intensity
Measurement and Chemical Structure Identification of the Polyester Obtained in the
Experimental Example 8.
Chemical shift (in ppm) and intensities (in paratheses) of proton resonances in the middle
monomer (bold) of linkage

| Structure name | $B_1$ (2H) | $B_2$ (2H) | $B_3$ (2H) | $B_4$ (2H) | $C_1$ (2H) | $C_2$ (2H) | $C_3$ (2H) | $C_4$ (2H) | $C_5$ (2H) | $I_{av}$ | $M_p$ (mol %) |
|---|---|---|---|---|---|---|---|---|---|---|---|
| p(TBT)$_{n3}$ | 4.41 (I = 260/2) | 1.95 (I = 267/2) | 1.95 (I = 267/2) | 4.41 (I = 260/2) | — | — | — | — | — | 132 | 28 |
| p(TBC)$_{n1}$ | 4.35 (I = 108) | 1.84 (I = 114) | 1.78 (—) | 4.13 (I = 108) | — | — | — | — | — | 110 | 24 |
| p(TCC)$_{n4}$ | — | — | — | — | 4.32 (I = 142) | 1.78 (—) | 1.47 (I = 143) | 1.68 (—) | 2.32 (I = 139) | 141 | 30 |
| p(CBC)$_{n5}$ | 4.06 (I = 44/2) | 1.68 (—) | 1.68 (—) | 4.06 (I = 44/2) | — | — | — | — | — | 22 | 5 |
| p(CCC)$_{n2}$ | — | — | — | — | 4.03 (I = 60) | 1.62 (I = 123/2) | 1.35 (I = 64) | 1.62 (I = 123/2) | 2.28 (I = 59) | 61 | 13 |

$I_{av}$ = average bonding intensity is obtained by calculating intensities (I value is based on that I of 8.01 ppm = 400) measured by chemical shifts of different protons in bonding intermediates.
$M_p$ = relative mole percentage is obtained by calculating percentages of average intensity $I_{av}$ in different structures.
(—): represents that overlapping of chemical shifts of protons of different structures, and the intensity thereof can not be accurately measured.

EXPERIMENTAL EXAMPLE 9

In this experimental example, firstly, 1 mole of terephthalic acid, 1.39 mole of 1,4-butanediol and 1.48 mole of ε-caprolactone are weighted out as raw material and is added into the reactor, and 0.74 mmole of Sn(Oct)$_2$ catalyst is added into the reactor. Nitrogen is passed into the reactor at a flow rate of 1 L/min, and the esterification temperature is set at 200° C. with a stirring speed of 500 rpm, so as to perform 4 hours of esterification reaction. After the esterification reaction is finished, 0.293 mmole of Ti(Obu)$_4$ catalyst is added while the temperature is slowly raised to a condensation reaction temperature of 255° C., and a vacuum level is lowered to less than 0.5 mmHg via the hydraulic pump, so as to perform 4 hours of condensation reaction to obtain a polyester 9. An evaluation of the polyester 9 obtained by the above-mentioned conditions is performed, a measured intrinsic viscosity (IV) thereof is 0.46 dL/g, a number-average molecular weight ($M_n$) thereof is $8.2 \times 10^4$ g/mol, and a measured melting point (TO thereof is 115.6° C. Furthermore, a mechanical strength test is performed to the polyester 9, and through the ASTM 638 type IV test, a measured tensile strength ($\sigma$) of the polyester 9 is 17 MPa, and a measured elongation at break ($\varepsilon$) of the polyester 9 is 356.3%. By performing the 60 day lipase hydrolysis test to the polyester 9 to evaluate the biodegradability thereof, a weight loss of the polyester 9 is measured to be 58.9%. In addition, biodegradability of the polyester 9 and biodegradability of the Ecoflex are further compared, wherein Poly(butylene-terephthalate) (PBT) is used as a negative control, and the results are as shown in FIG. 1. It can be known from FIG. 1, the polyester 9 synthesized in the experimental example 9 has biodegradability more superior to that of the Ecoflex.

EXPERIMENTAL EXAMPLE 10

In this experimental example, firstly, 1 mole of terephthalic acid, 1.4 mole of 1,4-butanediol and 0.5 mole of ε-caprolactone are weighted out as raw material and is added into the reactor, and 0.74 mmole of $Sn(Oct)_2$ catalyst is added into the reactor. Nitrogen is passed into the reactor at a flow rate of 1 L/min, and the esterification temperature is set at 200° C. with a stirring speed of 500 rpm, so as to perform 2 hours of esterification reaction. After the esterification reaction is finished, 0.293 mmole of $Ti(Obu)_4$ catalyst is added, the temperature is slowly raised to a condensation reaction temperature of 260° C., and a vacuum level is lowered to less than 0.5 mmHg via the hydraulic pump, so as to perform 2 hours of condensation reaction to obtain a polyester 10. An evaluation of the polyester 10 obtained by the above-mentioned conditions is performed, a measured intrinsic viscosity (IV) thereof is 0.41 dL/g, a number-average molecular weight ($M_n$) thereof is $7.4 \times 10^4$ g/mol, and a measured melting point ($T_m$) thereof is 139.2° C. Furthermore, a mechanical strength test is performed to the polyester 10, and through the ASTM 638 type IV test, a measured tensile strength ($\sigma$) of the polyester 10 is 12 MPa, and a measured elongation at break ($\varepsilon$) of the polyester 10 is 140%. By performing the 60 day lipase hydrolysis test to the polyester 10 to evaluate the biodegradability thereof, a weight loss of the polyester 10 is measured to be 10.2%. In addition, the $^1$H-NMR resonance spectroscopy bonding intensity measurement and the chemical structure identification are performed to the polyester 10, and the results are as shown in Table 5. It can be known from Table 5, the polymerized polyester 10 is composed of five units $p(TBT)_{n3}$, $p(TBC)_{n1}$, $p(TCC)_{n4}$, $p(CBC)_{n5}$ and $p(CCC)_{n2}$ that respectively have a specific number of repeating units.

TABLE 5

$^1$H-NMR Resonance Spectroscopy Bonding Intensity Measurement and Chemical Structure Identification of the Polyester Obtained in the Experimental Example 10.
Chemical shift (in ppm) and intensities (in paratheses) of proton resonances in the middle monomer (bold) of linkage

| Structure name | $B_1$ (2H) | $B_2$ (2H) | $B_3$ (2H) | $B_4$ (2H) | $C_1$ (2H) | $C_2$ (2H) | $C_3$ (2H) | $C_4$ (2H) | $C_5$ (2H) | $I_{av}$ | $M_p$ (mol %) |
|---|---|---|---|---|---|---|---|---|---|---|---|
| $p(TBT)_{n3}$ | 4.41 (I = 231/2) | 1.95 (I = 233/2) | 1.95 (I = 233/2) | 4.41 (I = 231/2) | — | — | — | — | — | 116 | 36 |
| $p(TBC)_{n1}$ | 4.35 (I = 73) | 1.84 (I = 78) | 1.78 (—) | 4.13 (I = 72) | — | — | — | — | — | 74 | 23 |
| $p(TCC)_{n4}$ | — | — | — | — | 4.32 (I = 95) | 1.78 (—) | 1.47 (I = 96) | 1.68 (—) | 2.32 (I = 92) | 94 | 29 |
| $p(CBC)_{n5}$ | 4.06 (I = 26/2) | 1.68 (—) | 1.68 (—) | 4.06 (I = 26/2) | — | — | — | — | — | 13 | 4 |
| $p(CCC)_{n2}$ | — | — | — | — | 4.03 (I = 26) | 1.62 (I = 55/2) | 1.35 (I = 30) | 1.62 (I = 55/2) | 2.28 (I = 25) | 27 | 8 |

$I_{av}$ = average bonding intensity is obtained by calculating intensities (I value is based on that I of 8.01 ppm = 400) measured by chemical shifts of different protons in bonding intermediates.
$M_p$ = relative mole percentage is obtained by calculating percentages of average intensity $I_{av}$ in different structures.
(—): represents that overlapping of chemical shifts of protons of different structures, and the intensity thereof can not be accurately measured.

It can be known from the results of the above experimental examples 1-10, the molecular weight of the biodegradable polyester is approximately 30,000 g/mol to 100,000 g/mol. The biodegradability of the biodegradable polyester is approximately 3% to 100%. The melting point ($T_m$) of the biodegradable polyester is approximately 90° C. to 170° C.

Table 6 shows the number-average molecular weights of the polyesters and the number of each unit in the polyesters obtained from the experimental examples 4, 7, 8 and 10. Table 7 shows estimated values of the molecular weights of the polyesters obtained from the experimental examples 4, 7, 8 and 10. It can be known from Table 6 and Table 7, in the biodegradable polyester, the molecular weight of the poly(terephthalate-di-(ε-caprolactone) unit ($p(TCC)_{n4}$) is approximately 17,000 to 30,000, the molecular weight of the poly(terephthalate-butylene-terephthalate) unit ($p(TBT)_{n3}$) is approximately 17,000 to 32,000, the molecular weight of the poly(terephthalate-butylene-ε-caprolactone) unit ($p(TBC)_{n1}$) is approximately 14,000 to 21,000, the molecular weight of the poly(ε-caprolactone-butylene-ε-caprolactone) ($p(CBC)_{n5}$) unit is approximately 2,100 to 6,400, and the molecular weight of the poly(tri(ε-caprolactone) ($p(CCC)_{n2}$) unit is approximately 4,200 to 17,500. The number of the poly(terephthalate-di-(ε-caprolactone) unit ($p(TCC)_{n4}$) is 38 to 67, the number of the poly(terephthalate-butylene-terephthalate) unit ($p(TBT)_{n3}$) is approximately 44 to 82, the number of the poly(terephthalate-butylene-ε-caprolactone) unit ($p(TBC)_{n1}$) is approximately 38 to 53, the number of the poly(ε-caprolactone-butylene-ε-caprolactone) unit ($p(CBC)_{n5}$) is s approximately 5 to 17, and the number of the poly(tri(ε-caprolactone) unit ($p(CCC)_{n2}$) is approximately 9 to 40.

TABLE 6

Number-Average Molecular Weights of Polyesters and Number of
Each Unit Included in Polyesters Obtained From Experimental Examples 4, 7, 8 and 10.

| Experimental example | Number-average molecular weight | p(TBT)$_{n3}$ | p(TBC)$_{n1}$ | p(TCC)$_{n4}$ | p(CBC)$_{n5}$ | p(CCC)$_{n2}$ |
|---|---|---|---|---|---|---|
| 4 | 70000 | 38 | 39 | 39 | 6 | 10 |
| 7 | 91000 | 52 | 52 | 66 | 17 | 40 |
| 8 | 73000 | 45 | 46 | 48 | 10 | 22 |
| 10 | 74000 | 44 | 45 | 47 | 8 | 14 |

TABLE 7

Estimated Values of Molecular Weights of Each Unit Included in
Polyesters Obtained From Experimental Examples 4, 7, 8 and 10.

| Embodiment | p(TBT)$_{n3}$ | p(TBC)$_{n1}$ | p(TCC)$_{n4}$ | p(CBC)$_{n5}$ | p(CCC)$_{n2}$ |
|---|---|---|---|---|---|
| 4 | 31500 | 14700 | 17500 | 2100 | 42005 |
| 7 | 17290 | 20020 | 30030 | 6370 | 17290 |
| 8 | 20440 | 17520 | 21900 | 3650 | 9490 |
| 10 | 26640 | 17020 | 21460 | 2960 | 5920 |

In summary, in the aforementioned embodiments, the numbers of units and ratios of the five units in the biodegradable polyester may be controlled by adjusting the polymerization conditions of the biodegradable polyester, so that the biodegradable polyester may has the adjustable biodegradability and melting point. As a result, the biodegradable polyester with proper biodegradability and melting point may be manufactured according to desired combinations of biomaterials to fabricate biodegradable plastics of different uses. Hence, the biodegradable polyester may significantly improve the technical levels of the biodegradable plastics, be widely applied in product developments of the biodegradable plastics, and achieve the purpose of protecting the environment.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A biodegradable polyester consisting of: a poly(terephthalate-di-(ε-caprolactone) segment, a poly(terephthalate-butylene-terephthalate) segment, a poly(terephthalate-butylene-ε-caprolactone) segment, a poly(ε-caprolactone-butylene-ε-caprolactone) segment, and a poly(tri(ε-caprolactone) segment, wherein a molar percentage of the poly(terephthalate-di-(ε-caprolactone) segment is 30%, a molar percentage of the poly(terephthalate-butylene-terephthalate) segment is 28%, a molar percentage of the poly(terephthalate-butylene-ε-caprolactone) segment is 24%, a molar percentage of the poly(ε-caprolactone-butylene-ε-caprolactone) segment is 5%, a molar percentage of the poly(tri(ε-caprolactone) segment is 13%, the biodegradable polyester is obtained by a polycondensation reaction of terephthalic acid, 1,4-butanediol and ε-caprolactone under an esterification reaction time of 4 hours, a polycondensation temperature of 270° C. and a polycondensation time of 4 hours, and based on 1 mole of terephthalic acid, a molar ratio of 1,4-butanediol to terephthalic acid is 1.4, and a molar ratio of ε-caprolactone to terephthalic acid is 1.6, and the biodegradable polyester has a molecular weight of 73,000 g/mol.

2. A biodegradable polyester consisting of: a poly(terephthalate-di-(ε-caprolactone) segment, a poly(terephthalate-butylene-terephthalate) segment, a poly(terephthalate-butylene-ε-caprolactone) segment, a poly(ε-caprolactone-butylene-ε-caprolactone) segment, and a poly(tri(ε-caprolactone) segment, wherein a molar percentage of the poly(terephthalate-di-(ε-caprolactone) segment is 25%, a molar percentage of the poly(terephthalate-butylene-terephthalate) segment is 45%, a molar percentage of the poly(terephthalate-butylene-ε-caprolactone) segment is 21%, a molar percentage of the poly(ε-caprolactone-butylene-ε-caprolactone) segment is 3%, a molar percentage of the poly(tri(ε-caprolactone) segment is 6%, the biodegradable polyester is obtained by a polycondensation reaction of terephthalic acid, 1,4-butanediol and ε-caprolactone under an esterification reaction time of 3 hours, a polycondensation temperature of 270° C. and a polycondensation time of 3 hours, and based on 1 mole of terephthalic acid, a molar ratio of 1,4-butanediol to terephthalic acid is 1.4, and a molar ratio of ε-caprolactone to terephthalic acid is 0.8, and the biodegradable polyester has a molecular weight of 70,000 g/mol.

3. A biodegradable polyester consisting of: a poly(terephthalate-di-(εcarprolactone) segment, a poly(terephthalate-butylene-terephthalate) segment, a poly(terephthalate-butylene-ε-caprolactone) segment, a poly(ε-caprolactone-butylene-ε-caprolactone) segment, and a poly(tri(ε-caprolactone) segment, wherein a molar percentage of the poly(terephthalate-di-(ε-caprolactone) segment is 29%, a molar percentage of the poly(terephthalate-butylene-terephthalate) segment is 36%, a molar percentage of the poly(terephthalate-butylene-ε-caprolactone) segment is 23%, a molar percentage of the poly(ε-caprolactone-butylene-ε-caprolactone) segment is 4%, a molar percentage of the poly(tri(ε-caprolactone) segment is 8%, the biodegradable polyester is obtained by a polycondensation reaction of terephthalic acid, 1,4-butanediol and ε-caprolactone under an esterification reaction time of 2 hours, a polycondensation temperature of 260° C. and a polycondensation time of 2 hours, and based on 1 mole of terephthalic acid, a molar ratio of 1,4-butanediol to terephthalic acid is 1.4, and a molar ratio of ε-caprolactone to terephthalic acid is 0.5, and the biodegradable polyester has a molecular weight of 74,000 g/mol.

\* \* \* \* \*